US011144508B2

(12) United States Patent
Chambliss et al.

(10) Patent No.: US 11,144,508 B2
(45) Date of Patent: *Oct. 12, 2021

(54) REGION-INTEGRATED DATA DEDUPLICATION IMPLEMENTING A MULTI-LIFETIME DUPLICATE FINDER

(71) Applicant: International Business Machines Corporation, Armonk, NY (US)

(72) Inventors: David D. Chambliss, Morgan Hill, CA (US); Joseph S. Glider, Palo Alto, CA (US); Danny Harnik, Tel Mond (IL); Ety Khaitzin, Holon (IL)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/440,797

(22) Filed: Jun. 13, 2019

(65) Prior Publication Data

US 2019/0294590 A1 Sep. 26, 2019

Related U.S. Application Data

(63) Continuation of application No. 15/084,413, filed on Mar. 29, 2016, now Pat. No. 10,394,764.

(51) Int. Cl.
*G06F 16/174* (2019.01)
*G06F 16/23* (2019.01)
*G06F 16/28* (2019.01)

(52) U.S. Cl.
CPC ...... *G06F 16/1752* (2019.01); *G06F 16/2365* (2019.01); *G06F 16/282* (2019.01)

(58) Field of Classification Search
CPC . G06F 16/1752; G06F 16/2365; G06F 16/282
See application file for complete search history.

(56) References Cited

U.S. PATENT DOCUMENTS 8,468,320 B1 * 6/2013 Stringham ............ G06F 3/0608
 711/170
8,832,034 B1 9/2014 Ramarao
(Continued)

OTHER PUBLICATIONS

IBM, "Meta Data Model For Multiple Government Programs, Populations, and Data Base Schemata, With Versioning for Data Mediation," IP.com, Apr. 22, 2008, pp. 1-4.
(Continued)

*Primary Examiner* — Alford W Kindred
*Assistant Examiner* — Cecile H Vo
(74) *Attorney, Agent, or Firm* — Zilka-Kotab, P.C.

(57) ABSTRACT

In one embodiment, a deduplicating storage system includes a processor and logic integrated with and/or executable by the processor. The logic is configured to cause the processor to perform a method which includes: computing a fingerprint of a data chunk, and determining whether a short term dictionary corresponding to the namespace comprises an entry corresponding to the fingerprint. In response to determining the short term dictionary does not comprise the entry, a determination is made whether a long term dictionary corresponding to the namespace comprises the entry. In response to determining the long term dictionary comprises the entry: the data chunk is written to the data store in the deduplicating manner, and the short term dictionary is repopulated with the entry. Moreover, in response to determining the long term dictionary does not comprise the entry, the data chunk is written to the data store in a non-deduplicating manner.

17 Claims, 6 Drawing Sheets

(56) References Cited

U.S. PATENT DOCUMENTS

| | | | |
|---|---|---|---|
| 8,954,399 | B1 | 2/2015 | Balakrishnan et al. |
| 9,177,028 | B2 | 11/2015 | Chambliss et al. |
| 10,121,019 | B2* | 11/2018 | Struttmann .......... H04L 9/0618 |
| 10,394,764 | B2* | 8/2019 | Chambliss .......... G06F 16/282 |
| 2010/0077161 | A1 | 3/2010 | Stoakes et al. |
| 2010/0274772 | A1* | 10/2010 | Samuels .............. G06F 16/188 707/693 |
| 2011/0196822 | A1* | 8/2011 | Zunger ................. G06F 16/27 707/609 |
| 2014/0222768 | A1* | 8/2014 | Rambo ............. G06F 16/2282 707/692 |
| 2015/0261445 | A1 | 9/2015 | Chatterjee et al. |
| 2017/0286444 | A1* | 10/2017 | Chambliss .......... G06F 16/282 |
| 2019/0272258 | A1 | 9/2019 | Chambliss et al. |
| 2019/0294590 | A1* | 9/2019 | Chambliss .......... G06F 16/1752 |

OTHER PUBLICATIONS

Anonymous, "Method to Improve Computation Performance in a Deduplication Enabled Globally Distributed Embedded Compute Infrastructure built Object Storage namespace," IP.com, Mar. 31, 2015, pp. 1-7.

Meera et al., "Redundant File Finder, Remover in Mobile Environment Thorough SHA-3 Algorithm," IEEE Sponsored 2nd International Conference on Electronic and Communication System, 2015, pp. 1-9.

Chambliss et al., U.S. Appl. No. 15/084,413, filed Mar. 29, 2016.

Non-Final Office Action from U.S. Appl. No. 15/084,413, dated Jul. 2, 2018.

Final Office Action from U.S. Appl. No. 15/084,413, dated Jan. 28, 2019.

Notice of Allowance from U.S. Appl. No. 15/084,413, dated Apr. 17, 2019.

Chambliss et al., U.S. Appl. No. 16/418,843, filed May 21, 2019.

List of IBM Patents or Patent Applications Treated as Related.

Non-Final Office Action from U.S. Appl. No. 16/418,843, dated Oct. 7, 2020.

Final Office Action from U.S. Appl. No. 16/418,843, dated Apr. 30, 2021.

Notice of Allowance from U.S. Appl. No. 16/418,843, dated Jul. 6, 2021.

* cited by examiner

REGION-INTEGRATED DATA DEDUPLICATION IMPLEMENTING A MULTI-LIFETIME DUPLICATE FINDER

This application is a continuation of U.S. patent application Ser. No. 15/084,413, which is now U.S. Pat. No. 10,394,764.

BACKGROUND

The present invention relates to data storage, and more specifically, this invention relates to data deduplication in a primary storage environment.

Storage systems which store large amounts of data sparsely written within a virtual namespace can partition the namespace into regions, each region being managed as a non-overlapping portion of the namespace. As an example, a block storage system may provision many volumes, each volume having an address space of many gigabytes (GBs). Similarly, each volume may include a plurality of regions, and a region may span 1-100 megabytes (MBs) within the volume. Thus, each volume is partitioned into multiple regions, each managing data stored in their own namespace.

Furthermore, in a primary storage system which is dominated by complex read and write data accesses of relatively small size (e.g. 4 KB or 64 KB), performance is often a key requirement and therefore persistent metadata utilized to service data requests must be primarily referenced while in fast-access memory. In conventional storage systems, it is not always possible to keep all metadata needed to efficiently manage the entire namespace in fast-access memory, as the amount of metadata necessary for such management may exceed the available memory.

The amount of metadata necessary for efficient management of a namespace may also increase in systems employing data deduplication to maximize the amount of available storage in the system. Data deduplication generally involves the identification of duplicate (triplicate, etc.) data portions, e.g. on different volumes or regions within the namespace, and reduction of the amount of storage consumed by freeing the storage space associated with all but one (or a relatively small number in cases where redundancy is desirable) copy of the data. To maintain consistency and provide access to the data, references such as pointers, etc. may be implemented to direct access requests to the single retained copy.

While deduplication effectively increases available storage compared to retaining a plurality of redundant duplicates, the technique requires additional metadata to manage the references pointing from the duplicated location to the retained data location.

In addition, primary storage systems are distinct from backup storage systems in which conventional deduplication techniques are employed, in that the size of the data portions used for detecting presence of duplicates is much less than that used for deduplication in backup storage systems. This further increases the amount of metadata necessary to manage the storage system, exacerbating the impact on overall system performance.

This is especially the case for primary storage systems which, distinct from backup storage systems, must perform deduplication as data arrives rather than periodically according to a deduplication schedule. In addition, for primary storage systems performance is largely measured according to input/output throughput, and when coupled with the relatively small data portion size used to detect duplicates, the need to identify duplicates at time of arrival (e.g. receipt of a write request) is a significant and detrimental impact on system performance.

Accordingly, efficiently managing the metadata in fast-access memory is of great significance, particularly for primary storage systems for which conventional deduplication techniques are not suitable. It would therefore be beneficial to provide techniques, systems, and corresponding computer program products for efficiently managing deduplication metadata in the context of primary storage systems.

SUMMARY

In one embodiment, a deduplicating storage system is configured to perform deduplication in conjunction with random read and write operations across a namespace. The system includes a processor and logic integrated with and/or executable by the processor, the logic being configured to cause the processor to perform a method. The method includes: computing a fingerprint of a data chunk, and determining whether a short term dictionary corresponding to the namespace comprises an entry corresponding to the fingerprint. In response to determining the short term dictionary comprises the entry corresponding to the fingerprint, the data chunk is written to a data store corresponding to the namespace in a deduplicating manner. However, in response to determining the short term dictionary does not comprise the entry corresponding to the fingerprint, a determination is made as to whether a long term dictionary corresponding to the namespace comprises the entry corresponding to the fingerprint. In response to determining the long term dictionary comprises the entry corresponding to the fingerprint: the data chunk is written to the data store in the deduplicating manner, and the short term dictionary is repopulated with the entry corresponding to the fingerprint. Moreover, in response to determining the long term dictionary does not comprise the entry corresponding to the fingerprint, the data chunk is written to the data store in a non-deduplicating manner. The short term dictionary comprises a first eviction policy, while the long term dictionary comprises a second eviction policy. The first eviction policy is configured to evict one or more entries of the short term dictionary in response to a new entry being inserted into the short term dictionary. Furthermore, the second eviction policy is configured to evict one or more entries of the long term dictionary in response to a new entry being inserted into the long term dictionary.

Other aspects and embodiments of the present invention will become apparent from the following detailed description, which, when taken in conjunction with the drawings, illustrate by way of example the principles of the invention.

DETAILED DESCRIPTION

Figure 1:
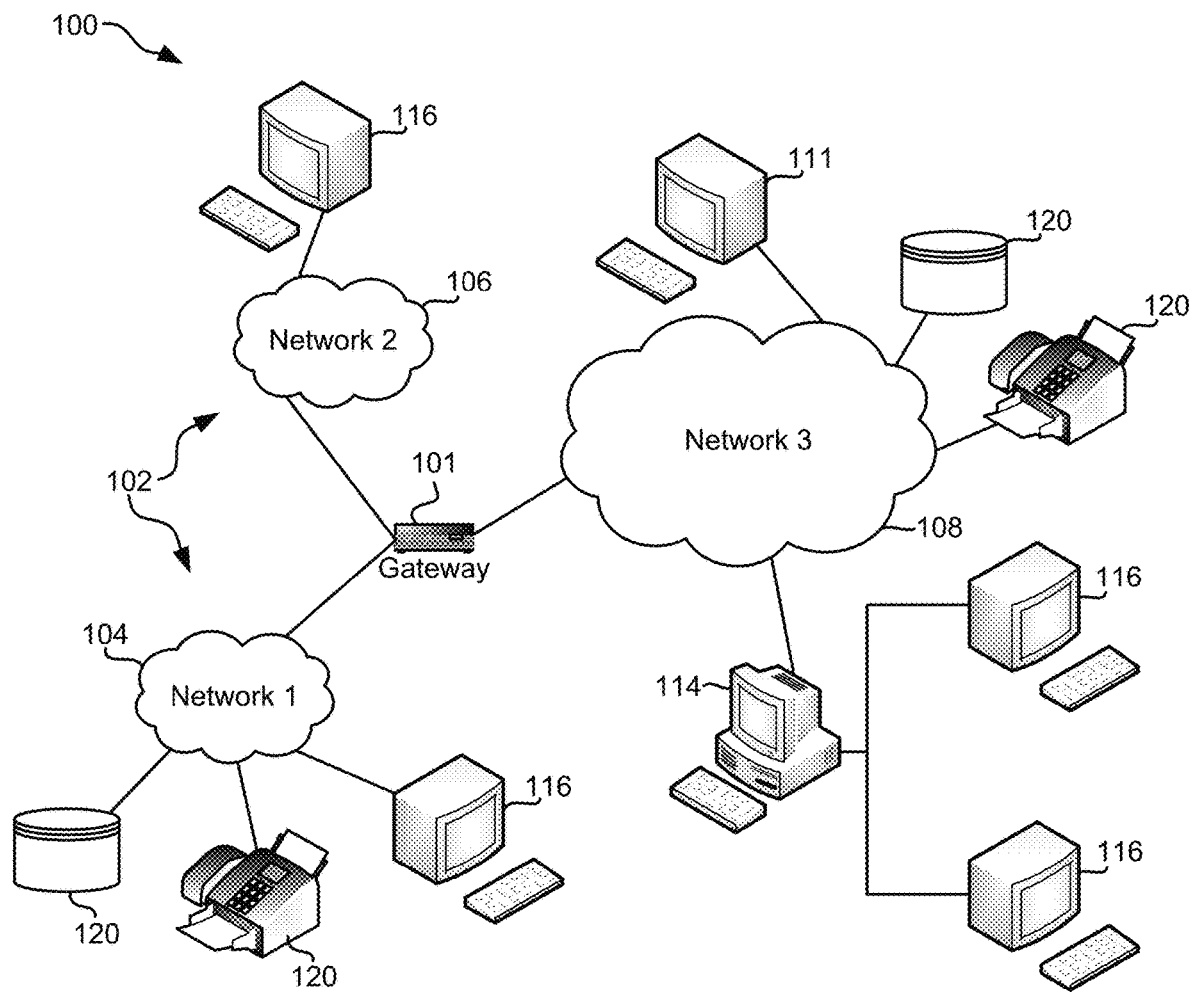
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for efficient management of metadata in the context of data deduplication, particularly for primary storage system environments.

In one general embodiment, a computer program product for performing deduplication in conjunction with random read and write operations across a namespace includes a computer readable storage medium having program instructions embodied therewith. The computer readable storage medium is not a transitory signal per se, and the program instructions executable by a computer to cause the computer to perform a method. The method includes: receiving, at the computer, a write request comprising a data chunk; computing, by the computer, a fingerprint of the data chunk; determining, by the computer, whether a short term dictionary corresponding to the namespace comprises an entry corresponding to the fingerprint; in response to determining the short term dictionary comprises the entry corresponding to the fingerprint, writing, by the computer, the data chunk to a data store corresponding to the namespace in a deduplicating manner; in response to determining the short term dictionary does not comprise the entry corresponding to the fingerprint, determining, by the computer, whether a long term dictionary corresponding to the namespace comprises the entry corresponding to the fingerprint; in response to determining the long term dictionary comprises the entry corresponding to the fingerprint, writing, by the computer the data chunk to the data store in the deduplicating manner; and in response to determining the long term dictionary does not comprise the entry corresponding to the fingerprint, writing, by the computer, the data chunk to the data store in a non-deduplicating manner.

In another general embodiment, a computer-implemented method is configured for performing deduplication in conjunction with random read and write operations across a namespace. The method includes: receiving a write request comprising a data chunk; computing a fingerprint of the data chunk; determining whether a short term dictionary corresponding to the namespace comprises an entry corresponding to the fingerprint; in response to determining the short term dictionary comprises the entry corresponding to the fingerprint, writing the data chunk to a data store corresponding to the namespace in a deduplicating manner; in response to determining the short term dictionary does not comprise the entry corresponding to the fingerprint, determining whether a long term dictionary corresponding to the namespace comprises the entry corresponding to the fingerprint; in response to determining the long term dictionary comprises the entry corresponding to the fingerprint, writing the data chunk to the data store in the deduplicating manner; and in response to determining the long term dictionary does not comprise the entry corresponding to the fingerprint, writing the data chunk to the data store in a non-deduplicating manner.

In still another general embodiment, a deduplicating storage system is configured to perform deduplication in conjunction with random read and write operations across a namespace. The system includes a processor and logic integrated with and/or executable by the processor, the logic being configured to cause the processor to perform a method. The method includes: receiving a write request comprising a data chunk; computing a fingerprint of the data chunk; determining whether a short term dictionary corresponding to the namespace comprises an entry corresponding to the fingerprint; in response to determining the short term dictionary comprises the entry corresponding to the fingerprint, writing the data chunk to a data store corresponding to the namespace in a deduplicating manner; in response to determining the short term dictionary does not comprise the entry corresponding to the fingerprint, determining whether a long term dictionary corresponding to the namespace comprises the entry corresponding to the fingerprint; in response to determining the long term dictionary comprises the entry corresponding to the fingerprint, writing the data chunk to the data store in the deduplicating manner; and in response to determining the long term dictionary does not comprise the entry corresponding to the fingerprint, writing the data chunk to the data store in a non-deduplicating manner.

General Storage, Network, and Computing Concepts

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
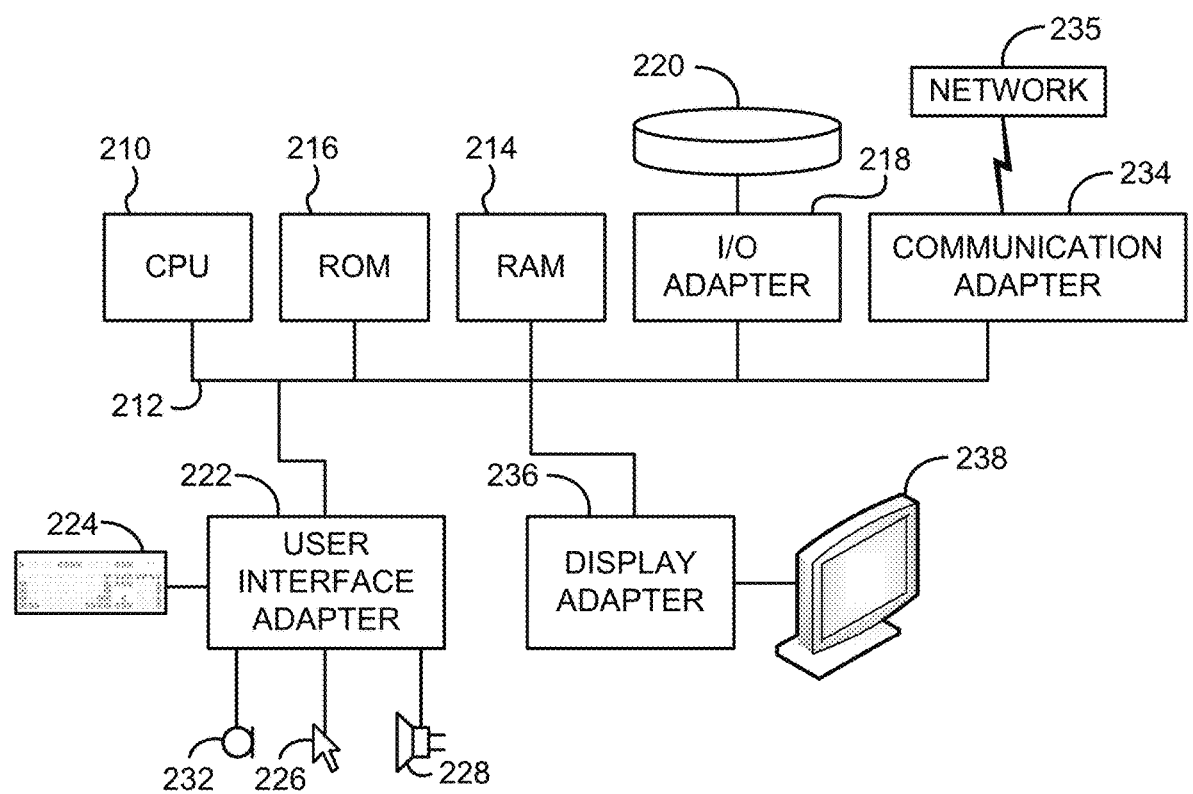
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
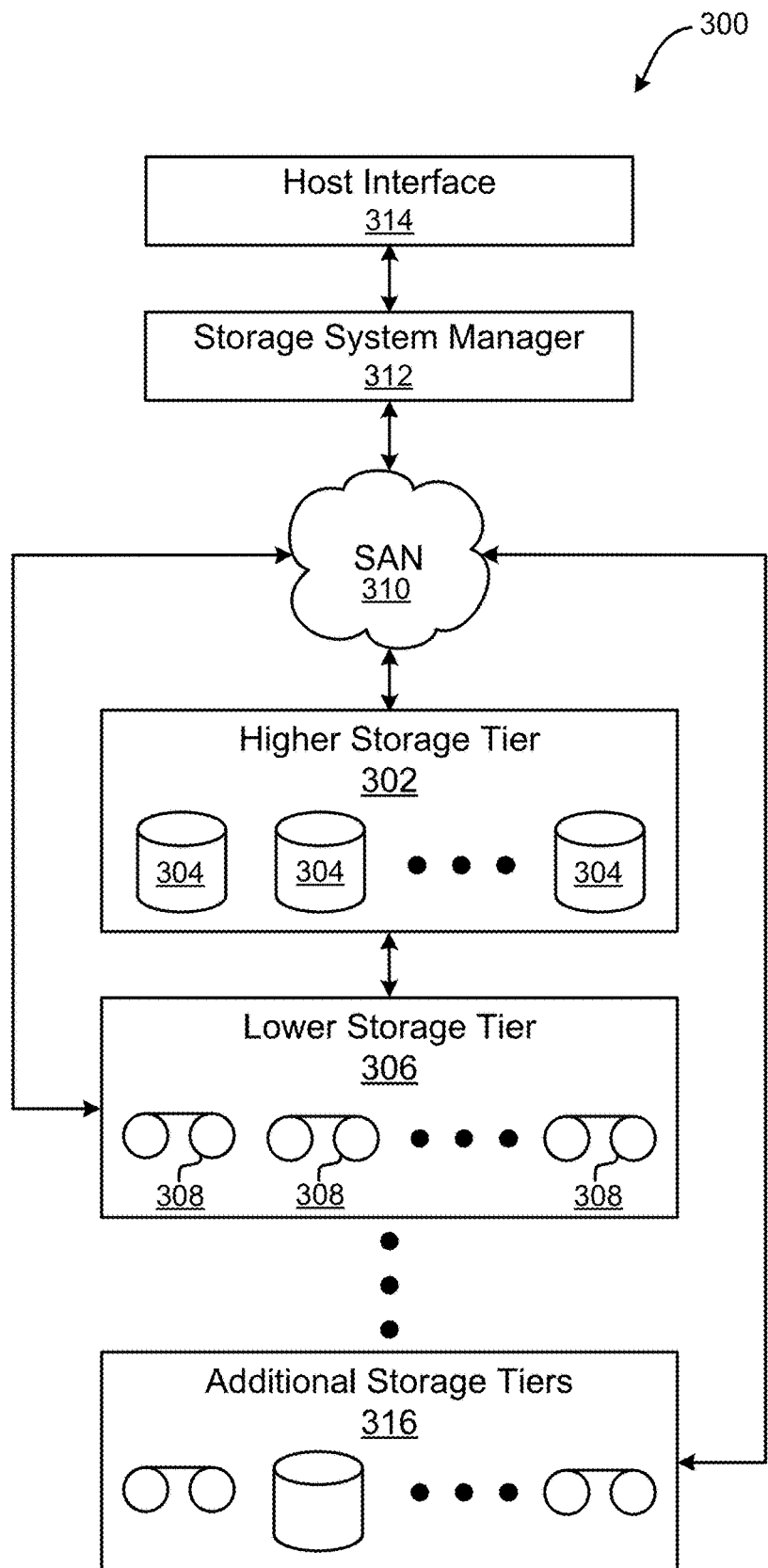
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. Although the present inventive concepts do not require a tiered storage environment to realize the advantages and benefits disclosed herein, in various exemplary embodiments a tiered storage system is an appropriate environment in which to implement said inventive concepts. As will be understood by a person having ordinary skill in the art upon reading the present descriptions, preferred embodiments convey particular advantage when implementing the instant disclosures on a primary storage system.

With continuing reference to FIG. 3, the storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Duplicate Finder

Data deduplication is typically employed for backup storage systems, which are generally oriented toward stream processing of backups and restores, and much different from primary storage access patterns. For instance, primary storage access generally includes a mixture of smaller reads and writes, often not sequential, and often including updates of virtual data.

In addition, performance requirements for backup storage systems are different than primary storage, e.g. backup storage systems typically focus more on streaming bandwidth whereas primary storage performance often focuses on the number input/output operations per second (IOPS) and latency in addition to aggregate throughput. Further still, backup storage systems that deduplicate generally put primary emphasis on deduplication effectiveness whereas primary storage systems generally put primary emphasis on performance.

Therefore, the metadata structures supporting backup storage systems are generally quite different than for primary storage systems. Although deduplicating backup storage systems might keep some deduplication-detection metadata in memory for faster access, the information contained in that metadata is generally just enough to enable a page-in of a dense subset of deduplication-detection metadata pertaining to data most closely resembling data being currently ingested (e.g. new version of a file as in 'extreme binning' paper, or new daily backup for a user that has already backed up previous versions of the data), and the dense deduplication-detection metadata paged in from disk is only used to deduplicate the stream or file currently being ingested.

This structure is not optimal for primary storage, where it is more desirable to be able to deduplicate against any other data already in the system, rather than just a portion of existing data identified as likely to be a previous version of, or close resemblance to, an existing object within the virtual namespace.

In addition, applying a conventional deduplication technique to a primary storage system, e.g. by performing traditional deduplication when the storage system is not actively in use, is associated with a disadvantageous lag due to the need to process the full storage system capacity to locate and reduce/remove duplicate data portions. As a result, such systems must include a sufficient amount of additional storage to accommodate the lag between writing duplicate data and performing the deduplication process, which may take days or weeks for storage system architectures commonly employed at the time of the present invention.

For instance, in a scenario where deduplication may accomplish a 20:1 reduction in storage consumption (e.g. in a storage system serving a plurality of highly similar virtual machines), writing data in a duplicative manner can result in approximately two weeks' worth of activity consuming the equivalent of about a year's worth of activity if the same data were written in a deduplicated manner. In other words, under the present scenario employing the presently disclosed inventive concepts may reduce storage consumption by a significant factor, and therefore significantly reduce the amount of storage resources necessary to store effectively the same amount of information within the system.

Accordingly, a novel metadata structure and deduplication technique is desirable to improve the function of primary storage systems and similar environments with distinct performance requirements such as those set forth above.

Implementing the presently disclosed inventive concepts will advantageously achieve this improvement by reducing the amount of storage space on a primary storage system necessary to provide access to a particular data portion by significantly reducing or avoiding duplication common to conventional storage systems.

In addition, by employing the presently disclosed inventive concepts, I/O load and latency associated with deduplication can be reduced, and throughput of the storage system may be improved relative to implementing a conventional data deduplication scheme on a primary storage system. In various approaches, these performance benefits are conveyed by using a special metadata structure and duplicate chunk finder, in accordance with the inventive embodiments set forth herein.

A critical component for deduplication is a duplicate finder that, when given a chunk of data being written to a virtual address, determines whether there is likely to be already a copy of the same content at another address. When such a duplicate is found, it is an opportunity for the remaining components to confirm the duplicate and perform the new virtual write as a deduplicated write that updates metadata but does not store a new copy of the content.

A duplicate finder, as discussed herein, is conceptually a dictionary that maps unique keys (also referred to as "fingerprints") corresponding to chunks to the physical storage locations of the chunks.

As contemplated in the context of the present disclosure, a fingerprint is a number or other datum computed from the content of a chunk and used to represent it. The computation is done so that if two chunks are found to have equal fingerprint values then it is very likely the content of the two chunks are identical. For instance, a hash computed based on the content of the chunks is a suitable embodiment of a fingerprint, as well as any other equivalent tool or technique for generating a unique value or datum representing the chunk.

An ideal duplicate finder would contain an entry for every chunk stored in the system, so that every possible duplicate is found. However, performance is often a key requirement and the dictionary must be primarily referenced while in fast-access memory. The size of a complete dictionary may be 0.5% to 1% of the size of the stored content, which generally exceeds the size of available fast-access memory by a considerable factor. The available physical memory has other important uses, so it is beneficial to reduce the space occupied dictionary without impacting the effectiveness of finding duplicates. This is particularly the case for primary storage systems, which handle a much higher volume of chunks and throughput associated with read/write requests according to the unique characteristics of primary storage relative to backup storage, as discussed above.

Accordingly, the presently disclosed inventive concepts convey an improvement to storage system performance by enabling robust identification of duplicate data chunks in primary storage environments while minimizing the overhead associated therewith. Implementing the presently disclosed duplicate finder, in myriad embodiments, provides capacity for deduplication of data across a primary storage system that would otherwise be prohibitively expensive (e.g. in terms of overhead cost) using conventional backup-oriented deduplication techniques.

Moreover, a substantial benefit of the inventive embodiments disclosed herein is the detection of duplicates with high effectiveness. A long-term dictionary enables duplicates to be detected even when there is a long time between the first write of a certain content and a second duplicate write of the same content. By contrast, prior-art approaches are limited to detecting duplicates with a smaller time separation. The presently disclosed short-term dictionary and the repopulation policy provide that a large fraction of duplicates are found within a group of duplicates.

Figure 4:
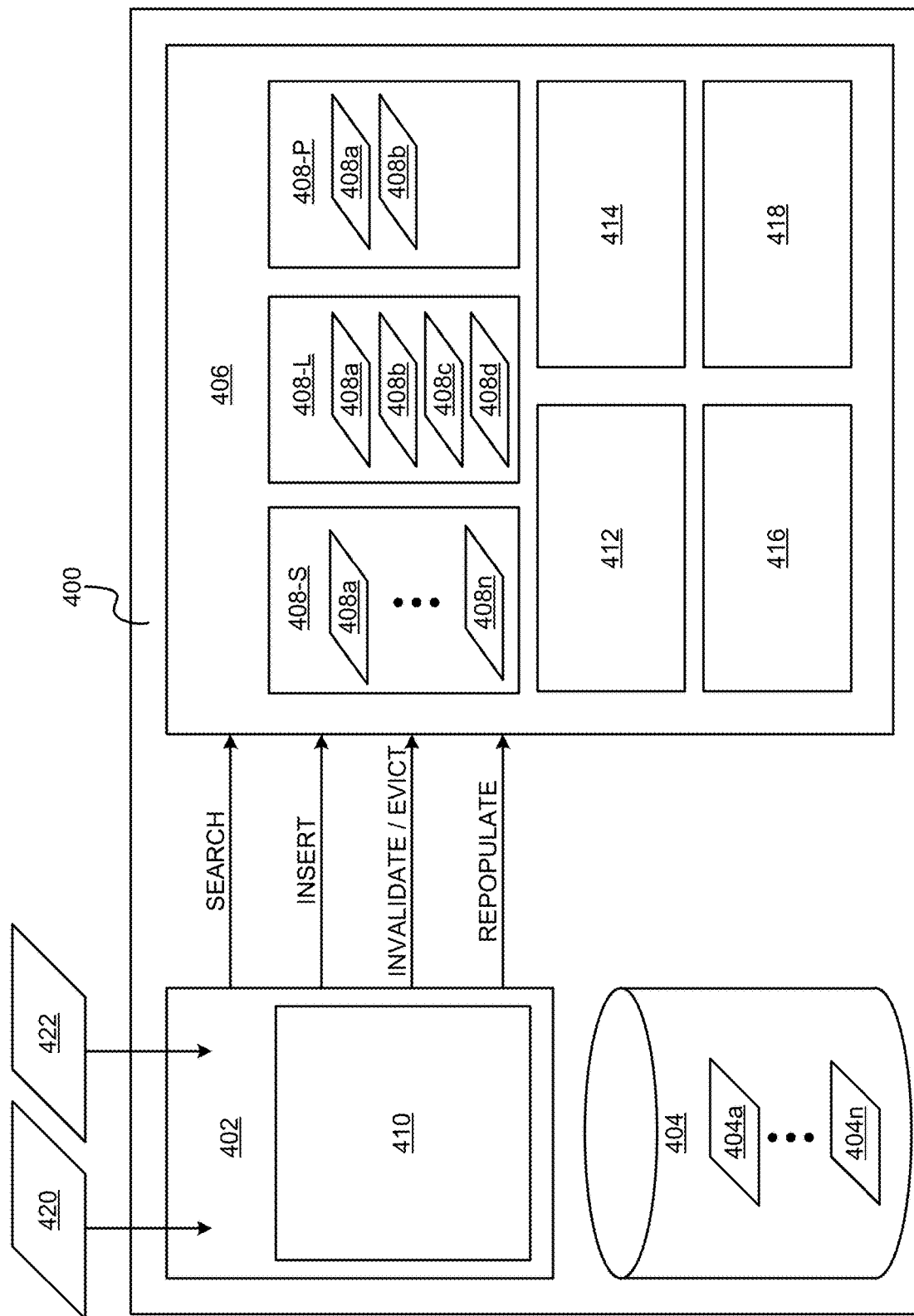
FIG. 4 depicts one embodiment of a storage system implementing a duplicate chunk finder.

With reference to FIG. 4, as described herein deduplicating storage system 400 generally comprises a deduplication engine 402 and a duplicate finder 406. The deduplication engine 402 maintains metadata that indicates the mapping from virtual addresses corresponding to various regions within a namespace 410 to physical locations of data chunks 404a . . . 404n stored via a storage medium or media 404. In various embodiments multiple virtual addresses may map to the same physical location(s), which are cases that deduplication has been successfully performed. The deduplication engine 402 receives read operations 420, and consults the metadata to perform the reads correctly. The deduplication engine receives write operations 422, and when new data is received invokes the duplicate finder to locate possible duplicates of that data already stored in the system. When a duplicate is found the deduplication engine 402 may perform a deduplicated write, which means it updates the metadata and does not write a new copy of the content to the storage medium 404. When a duplicate is not found the deduplication engine performs a non-deduplicated write, which means it writes the content to the storage medium 404, updates the metadata, and notifies the duplicate finder 406 of the new content. The deduplication engine also performs accounting to determine which stored chunks are no longer needed because there are no virtual addresses mapping to them, and to delete the unneeded chunks. When unneeded chunks are deleted the deduplication engine 402 may notify the duplicate finder 406 of the deletion.

In general, a duplicate finder 406 includes of a record of some or all data previously written to the system and procedures for taking new data written to the system and determining whether previously written data can be found that is identical to part or all of the new data. The record in the duplicate finder may be a complete or incomplete record, and may be guaranteed to be an accurate record or may be allowed to be inaccurate to improve performance. The record may include one or more dictionaries comprising a collection of entries 408a . . . 408n, each entry comprising a data fingerprint and a chunk location, the fingerprint preferably being derived from the content stored at the chunk location.

According to the embodiment shown in FIG. 4, the duplicate finder 406 comprises one or more, preferably two or more dictionaries, each comprising one or more entries 408a . . . 408n. The duplicate finder 406 may include a long-term dictionary 408-L (middle column), a corresponding long-term eviction policy 414, a short-term dictionary 408-S (left column), a short-term eviction policy 412, an insertion policy 418, and a repopulation procedure 416. As is described above, each dictionary comprises a collection of entries 408a . . . 408n, each entry comprising a data fingerprint and a chunk location, the fingerprint being derived from the content stored at the chunk location.

Optionally, the duplicate finder 406 may also include additional dictionaries, such as a permanent dictionary 408-P (right column). As shown in FIG. 4, the short term dictionary includes a plurality of entries 408a . . . 408n, the long term dictionary 408-L includes entries 408a, 408b, 408c, and 408d. The permanent dictionary includes entries 408a and 408b, each of which are preferably representative of one of the regions of the namespace 410.

The policies 412, 414, 418 and procedure 416 describe the behavior of the system 400 regarding when entries are to be added and when duplicates are found. The policies 412, 414, 418 and procedure 416 are preferably defined and executed so that only a minority of potential entries are directed to the long-term dictionary, e.g. less than 10% in one embodiment, and less than 1% in a preferred embodiment. Accordingly, entries in the long-term dictionary have a much longer residence time than those in the short-term dictionary. Moreover, detecting a duplicate in the long-term dictionary preferably causes a group of related entries to be populated into the short-term dictionary. The related entries populated as a group may be related specifically by being associated with a common region within the virtual address space, in one embodiment.

The benefits of the presently disclosed inventive concepts arise, at least in part due to locality that exists among duplicates in a write stream. As understood herein, locality describes the relationships among a first duplicate write, a first prior write whose content is identical to the first duplicate write, a second duplicate write, and a second prior write whose content is identical to the second duplicate write. Locality states that, if the first duplicate write and the second duplicate write are close (in time, or virtual address, or both) then the first prior write and second prior write are likely to be close in a comparable sense. When a duplicate is successfully found, a current virtual write has been, or is likely to be, identified as a first duplicate write and has been, or is likely to be, associated with a first prior write.

The repopulation policy, according to various embodiments, provides for optionally inserting into the short-term dictionary a group of entries corresponding to prior writes that are close to the first prior write just identified. When a second duplicate write arrives, it is thereby more likely that the corresponding second prior write's fingerprint is in the short-term dictionary so that it can be detected accurately and efficiently. In this manner, the presently disclosed inventive embodiments improve the function of the storage system with respect to deduplication of data.

Conventional systems, which may implement a single dictionary but not plural dictionaries and not organized in a hierarchical fashion, may benefit from some limited forms of locality. That benefit, however, is limited to the residence lifetime of the single dictionary. The present invention can extend the time span of duplicate detection by 10x, 100x, or more according to the details of the policies. Accordingly, the presently disclosed inventive embodiments improve the function of the storage system with respect to deduplication of data via improving ability to efficiently and robustly detect duplicates while minimizing the amount of overhead (e.g. memory allocation) associated with retaining metadata availability as needed to enable the duplicate detection process.

Furthermore, the repopulation policy can specifically take advantage of spatial locality in a way that conventional techniques do not. The long-term and short-term dictionary may, according to various embodiments, be consulted when the deduplication engine invokes the duplicate finder to find duplicates. Generally it is advantageous to consult both dictionaries for a given query, but once a duplicate is found there is generally no need to look further, thus reducing the overhead associated with the query process. Different embodiments may consult either the short term, the long term, or the permanent dictionary first, and proceed according to any consultation order as a skilled artisan reading the present descriptions would understand to be suitable.

Preferably, each of the dictionaries, e.g. long-term dictionary and short-term dictionary, is a data structure with memory space allocated to it, containing entries that associate fingerprint values to chunk physical locations. Many embodiments are possible and will be evident to one of ordinary skill in the art upon reading the instant disclosures. These include but are not limited to a simple hash table in one compute node; a partitioned set of hash tables distributed over multiple nodes; a set of lists addressed through a local or distributed hash table; a chain of separate sub-dictionaries; and a map of separate sub-dictionaries associated with distinct contexts. In an embodiment, a group of entries can be added to the short-term dictionary by adding an entire sub-dictionary to a chain or map, and a group of entries can be evicted by removing an entire sub-dictionary from a chain or map.

Each dictionary also preferably comprises a collection of entries, each entry logically containing a data fingerprint and a chunk location, the fingerprint being derived from the content stored at the chunk location. An entry does not necessarily occupy a single location in memory, and does not necessarily contain a full copy of either the fingerprint or the chunk location. Parts of the fingerprints and chunk locations might be stored in a shared form to reduce the memory size of the dictionary. Entries may also optionally include a reference counter indicating a number of references relying upon the data chunk associated with the entry.

The long-term dictionary and the short-term dictionary may, in some approaches, share particular elements. In one embodiment, the two dictionaries consist of disjoint subsets of entries in a single table or collection of tables, with a clear indication for any entry of the dictionary in which it is present. For example, a single bit in each entry might indicate by the value 0 that the entry is logically contained in the short-term dictionary and is therefore subject to the short-term eviction policy, insertion policy, and/or repopulation procedure, or alternatively by the value 1 that the entry is long-term, and thus subject to a long term eviction policy, insertion policy, and/or repopulation procedure. In embodiments where a permanent dictionary is included, alternative indicators may be utilized to designate an appropriate eviction policy, insertion policy, and/or repopulation procedure. For instance, permanent dictionary entries may be evicted only in response to determining the corresponding data chunk is no longer stored in the storage medium, according to one embodiment.

Each dictionary is also preferably managed so as to stay within a predefined memory constraint. Accordingly, in one approach inserting a new entry is preceded by a corresponding removal of a different entry. Over time, the rate of removals must be generally equal to the rate of insertions, unless the memory size is permitted to grow without limit. Entries may be removed either by invalidation or eviction. Invalidation of an entry may occur because the deduplication engine has determined that the corresponding chunk is no longer being stored so the entry is no longer valid. Eviction may occur when an otherwise valid entry is selected and removed. Each dictionary may have an eviction policy to preferentially choose some entries for eviction based on characteristics such as whether the entry has been detected as a prior for a duplicate write, and recency of such detection. In an embodiment, the policy may be non-preferential, based on a simple criterion such as first-in-first-out (FIFO) procedure, and/or based on position in the corresponding data structure. In an embodiment, each dictionary is allocated a fixed memory size, and entries are never evicted unless the number of vacancies is less than a threshold value. In another embodiment, the memory for each dictionary may be adjusted over time.

The eviction policy in a dictionary may be chosen to achieve a particular expected age distribution among the entries. For example, each entry may be associated with a lifetime parameter, either by recording the parameter as an explicit value or by associating the lifetime parameter with the position of the entry in memory, with different values of the lifetime applying to different entries. The lifetime parameter is used to modify the probability of the entry being selected for eviction each time it is visited as an eviction candidate. The shaped age distribution may serve to increase the longest resident time of valid entries and increase the benefits of holding a long-term dictionary.

The residence time of an entry is the length of time from insertion to a dictionary until removal from the dictionary. Once an entry is removed, the corresponding data chunk cannot be used for purposes of deduplication, until the chunk's fingerprint is re-inserted, e.g. until a new entry is inserted to reference the same chunk. Thus the residence time of an entry controls its opportunity to contribute to deduplication. For any given entry it is beneficial to have a longer residence time, but the average residence time may be determined by the average number of entries present and the average rate of insertions, in various approaches. Since the average number of entries present is capped by the memory constraint, increasing the average residence time requires that the average rate of insertions be limited. This is a primary aspect in which the presently disclosed inventive concepts thus improve the performance of the storage system by providing computationally efficient and robust duplicate finding techniques.

For instance, in one embodiment the duplicate finder applies an insertion policy to determine into which dictionary, if any, a new entry should be inserted, and thereby limits the insertion rate into the long-term dictionary and/or permanent dictionary so as to preserve a long average residence time in it. Any new chunk written into the system may potentially be represented with a dictionary entry, and the policy is applied to decide. The policy provides that a fraction less than 10% of insertions offered to the duplicate finder by the deduplication engine are inserted into the long-term dictionary. In an embodiment, that fraction is less than 1%. Of those insertions offered by the deduplication engine that are not inserted into the long-term dictionary, in various embodiments all, some, or none are inserted into the short-term dictionary.

In an embodiment, chunks recently read to fulfill read requests are also processed as candidate entries for insertion into the dictionary, and the insertion policy is applied to decide whether to insert them.

In an embodiment, the insertion policy selects insertions into the long-term dictionary according to their virtual addresses. The virtual address space is divided into regions used by the repopulation procedure as described herein. Each region contains at least one virtual address that is recognized by the insertion policy as leading to insertion into the long-term dictionary. Each region may have additional virtual addresses also eligible for long-term insertion but there is a definite limit on the number of eligible virtual addresses per region.

The short-term dictionary, because its purpose is to capture clusters of deduplication opportunities that occur in a relatively short amount of time (e.g. minutes to hours), is allowed to have a much shorter residence time than the long-term dictionary. This accommodates a high rate of insertions, which is required so that entire locality groups of entries may be made available for duplicate detection. Many short-term insertions are performed by the repopulation procedure. There may be additional short-term insertions from the offering of insertions by the deduplication engine.

The repopulation procedure is generally performed whenever a duplicate is found by the duplicate finder in the long-term dictionary and used by the deduplication engine to perform a deduplication. Different embodiments may perform repopulation additionally for some or all duplicates found in the short-term dictionary, or may suppress repopulation under some conditions. The repopulation procedure serves to re-insert entries which had previously been offered to the duplicate finder but which might not be present in either dictionary. They are inserted in anticipation that writes are likely to arrive soon containing new duplicate copies of some of the content referenced in the re-inserted entries.

The repopulation procedure identifies a group of entries to be re-inserted, and inserts them into the short-term dictionary. In an embodiment, they are inserted as individual entries whose eventual possible eviction is governed by an eviction policy applied to individual entries. In another embodiment, they are inserted as a block that participates in the short-term dictionary as a unit, and which might be eventually evicted from the short-term dictionary in a single action.

The preferred basis of identifying groups for re-insertion is region proximity in the namespace of the data storage system. After one duplicate write is detected, it may be that a much larger unit of data is being duplicated, so that many more duplicates will arrive associated with content in original locations that are close together. In the repopulation procedure, then, chunks whose original virtual addresses are close in the namespace are gathered in the group for re-insertion. These might be contiguous regions in a linear address space; multiple chunks within the same large file; chunks associated with smaller files contained in a common directory; or other relations of proximity derived from metadata in a file system or object store.

In an embodiment, the namespace is divided into non-overlapping regions according to proximity criteria. The division might be predetermined; for example, a division into fixed-size regions in a linear address space. The division might also be created as data arrives, for example as files are added into a file system. The group for repopulation is determined from the region. Specifically, after a new write is found to contain a duplicate of the content of a prior write, the region containing the virtual address of the prior write is identified, and entries are generated for substantially all stored chunks associated with virtual addresses in that region, and inserted as a group into the short-term dictionary. Additionally, entries for nearby regions may also be included.

Repopulation can also proceed in stages, so that a fraction of the region is inserted first, and the rest of the region is inserted later after additional found duplicates confirm that completion of repopulation is worthwhile. The insertion policy can be designed with the repopulation procedure in mind. Where repopulation is based on regions, one address is designated as a representative for each region. Then when a chunk is stored in association with that address, the insertion policy may ensure that the entry offered for insertion for that chunk is inserted into the long-term dictionary. In an embodiment, the namespace, regions, and long-term dictionary sizes are configured such that there can always be one representative entry present in the long-term dictionary for each region.

Where there is a conventional order of addresses within a region, such as increasing numeric values of logical block addresses or increasing offsets inside a large file, the insertion policy can anticipate that to achieve better duplicate finding in the case of sequential writing. The representative address is selected as the first address in its region according to that order. When a duplicate of the region is written in sequential order, the first data received will often be at the first address according to that order, and thus the entire region's entries may be repopulated in time to detect all of the duplicate writes that arrive soon after.

There are embodiments in which some entries evicted from the short-term dictionary are at that time inserted into the long-term dictionary. This can yield improved efficiency. There is no benefit for a given chunk to be represented in both the short-term dictionary and the long-term dictionary simultaneously, and the space it consumes in one would be better used to hold an additional distinct entry. However, an entry that should be given a long-term lifetime may be found more quickly if it is in the short-term dictionary, and at a time when that entry is a "hot" entry it may be desirable to insert it into the short-term dictionary and remove it from the long-term dictionary, and later upon eviction from the short-term dictionary to re-insert it into the long-term dictionary. Another benefit of inserting some entries evicted from short-term into long-term arises if the heat of the entries is measured as part of the short-term eviction logic, and the entries with higher heat are preferentially selected for long-term insertion. As utilized herein, the term "heat" refers to the frequency of being used as a found duplicate, and generally a hotter entry is more likely to prove valuable than one that is less "hot."

There are embodiments comprising more than two dictionaries in a hierarchy. For example there might be a permanent dictionary, a long-term-dictionary, and a short-term dictionary. The permanent dictionary might contain one entry per large region in the namespace of the storage system. It may be sized so that entries are removed after becoming invalid through data object deletion or overwrite, but valid entries are never removed from the permanent dictionary. After finding a duplicate via the permanent dictionary, the repopulation procedure may cause insertion into the short-term dictionary of all entries for a small region close to the found duplicate and also insertion into the long-term dictionary of a selection of representative sparse entries from the large region associated with the found duplicate. The long-term dictionary would perform eviction of valid entries as necessary. After finding a duplicate via the long-term dictionary, the repopulation procedure may cause insertion into the short-term dictionary of all entries for a small region close to the found duplicate.

FIGS. 5A-5D are simplified schematics of a storage system 400 at various stages of a deduplicating write process, according to one exemplary embodiment. The storage system 400 preferably includes at least the components, policies and procedures as described above with reference to FIG. 4, some of which are not shown in FIGS. 5A-5D for simplification and clarity of understanding. In the particular embodiments represented in FIGS. 5A-5D, the system 400 includes at least a namespace 410 which may be divided into a plurality of (optionally disjoint) regions, e.g. 430, 432. The system 400 also includes a storage medium 404 configured to store data chunks, e.g. 404*a* . . . 404*n*. The system also includes at least two dictionaries, more specifically as shown in the embodiment of FIGS. 5A-5D a short term dictionary 408-S and a long term dictionary 408-L. Each dictionary may comprise one or more entries 408*a* . . . 408*n*.

Figure 5A:
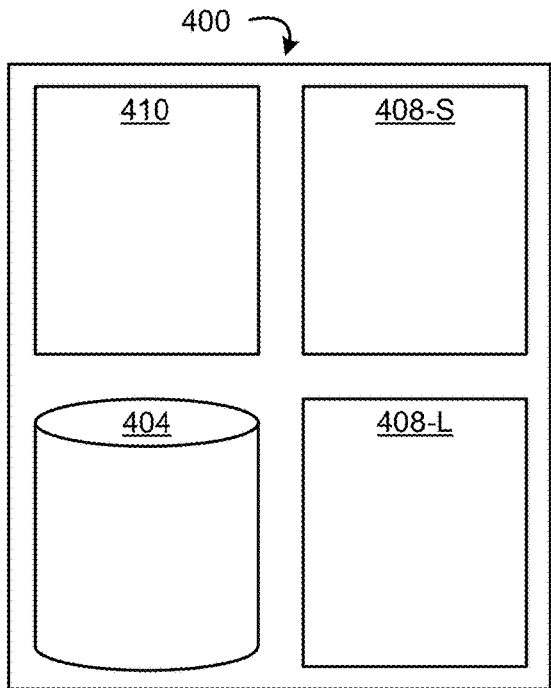
FIGS. 5A-5D are simplified schematics of a storage system at various stages of a deduplicating write process, according to one embodiment.
Figure 5B:
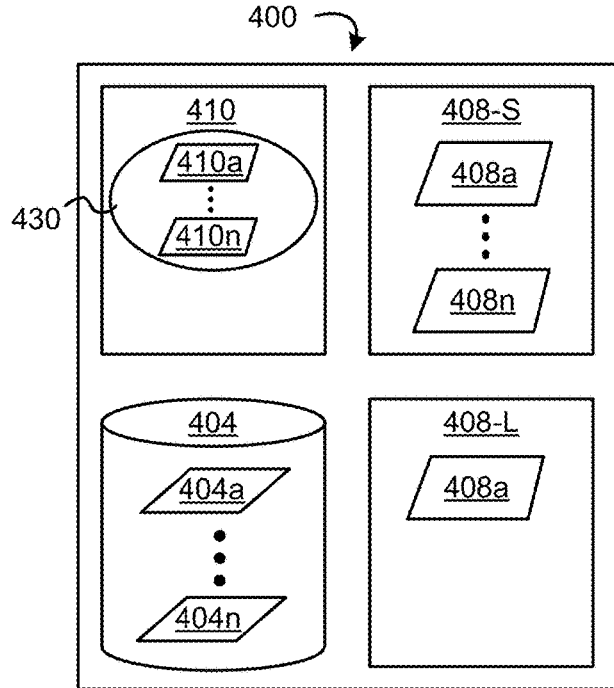
Figure 5C:
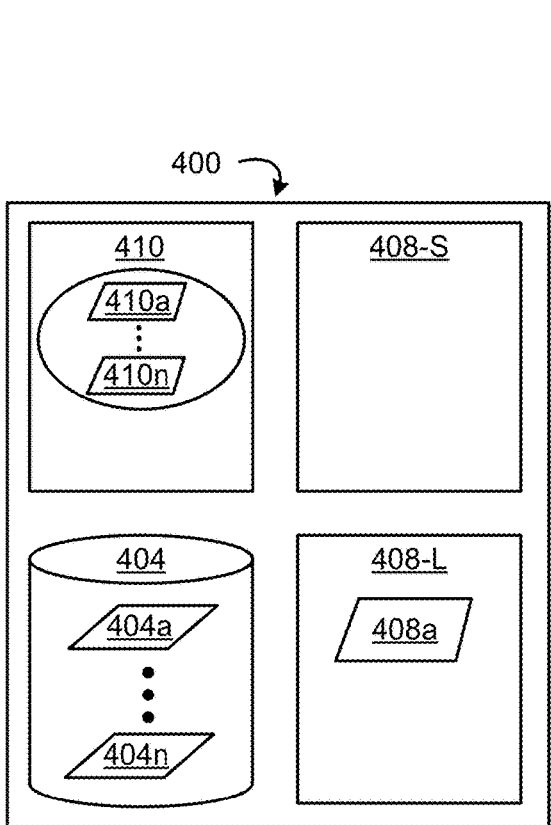
Figure 5D:
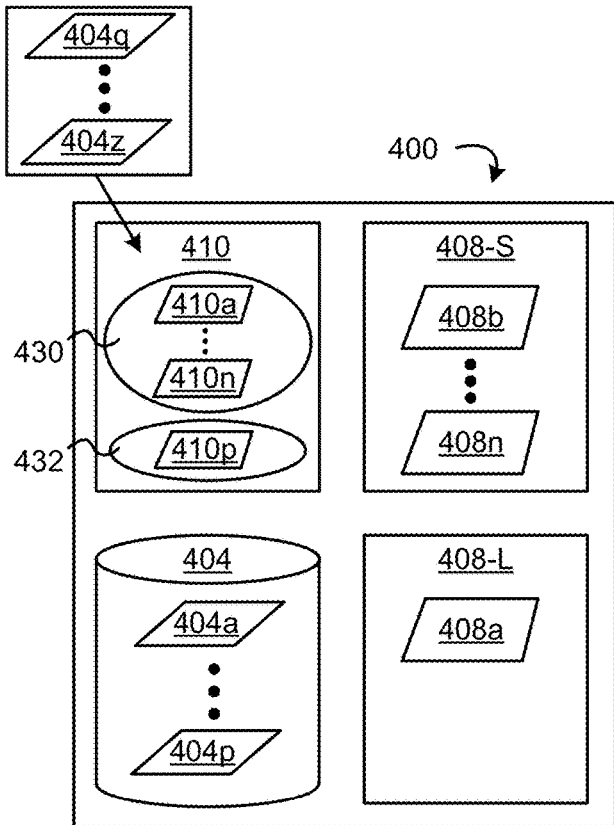

In brief, FIG. 5A represents the system 400 before any writes are performed. FIG. 5B represents the system 400 just after data for a plurality of chunks 404*a* . . . 404*n* are written to the storage medium 404, and mapped to a first region 430 in the namespace 410. FIG. 5C represents the system 400 after an unspecified amount of time has passed, and unrelated writes have occurred. FIG. 5D represents the system 400 shortly after data has been mapped to a second region 432, with at least one chunk 410*a* of the data written to the second region 432 being characterized by content equal to a chunk 410*a* previously mapped to the first region 430.

As seen in FIG. 5A, prior to any write operations being performed within the system 400, the system includes a namespace 410, which again may comprise one or more regions (not shown). The system also includes a storage medium 404 configured to store data associated with write requests, but as no write operations have been performed by the system 400, as shown in FIG. 5A no data are stored in the storage medium 404. The system also includes a short term dictionary 408-S and long term dictionary 408-L, but again since no write operations have been performed, in FIG. 5A each dictionary is empty, and does not comprise any entries corresponding to data chunks.

Turning now to FIG. 5B, the system 400 is represented after writing a plurality of data chunks 404*a* . . . 404*n* to the storage medium 404, said data chunks being mapped to addresses 410*a* . . . 410*n* of a first region 430 within the namespace 410. Accordingly, the short term dictionary 408-S now includes a plurality of entries 408*a* . . . 408*n* corresponding to the data chunks 404*a* . . . 404*n* and addresses 410*a* . . . 410*n*. For instance, the entries 408*a* . . . 408*n* each preferably include a fingerprint based on the content of the corresponding data chunk 404*a* . . . 404*n* and a location of the data chunk, which may include a physical location within the storage medium 404 and/or logical location (e.g. addresses 410*a* . . . 410*n*) corresponding to or associated with region 430 of the namespace 410. In addition, and according to preferred embodiments, at least one chunk is representative of the region 430, as shown in FIG. 5B this is representative data chunk 404*a*. Again in preferred embodiments, an entry 408*a* is created in the long term dictionary 408-L for the representative data chunk of the corresponding region. In particularly preferred embodiments, the representative data chunk is associated with a first address corresponding to the region, where addresses of the region are characterized by belonging to an ordered set of addresses.

In FIG. 5C, the system 400 is depicted after passage of an unspecified amount of time following the write operations discussed above with respect to FIG. 5B. The amount of time may generally be defined by or within one or more of the eviction policies, e.g. short term eviction policy 412 and/or long term eviction policy 414 as shown in FIG. 4. Moreover, the amount of time may be defined with respect to actual units of time, e.g. seconds, minutes, hours, days, weeks, etc. and/or may be defined with respect to occurrence of a particular threshold number of events, e.g. a threshold number of read or write operations, in various embodiments. In preferred approaches, the short term eviction policy defines the amount of time on the order of several seconds (e.g. 1-10 seconds, 1-30 seconds) and the long term dictionary defines the amount of time on a longer scale (e.g. several hours, days, or one week in alternative approaches).

In the particular embodiment shown in FIG. 5C, during or following passage of the amount of time, operations, etc., one or more unrelated write operations may be applied to the system 400, e.g. in regions other than region 430. As alluded to above, in order to maintain efficient duplicate finding capabilities with minimal associated overhead, it may therefore be advantageous to evict entries from the short term dictionary 408-S to make room for addition of new entries (e.g. corresponding to the unrelated writes occurring during or following the unspecified amount of time passed). Accordingly, even though the data chunks 404*a* . . . 404*n* are retained in the storage medium 404 and remain associated with corresponding addresses 410*a* . . . 410*n* in the region 430 of namespace 410, the entries 408*a* . . . 408*n* are evicted from the short term dictionary according to the short term eviction policy 412 (not shown).

In various embodiments, the retention time of individual entries in the short term dictionary may be determined further based at least in part on one or more weights associated with the corresponding data chunk(s) and/or write requests. For instance, a particular data chunk or series of sequentially written data chunks may have associated therewith a weight indicative of an importance of the data chunk's retention in the storage system. The weight may be evaluated, e.g. in conjunction with evaluating the appropriate eviction policy, to determine whether to retain an entry otherwise subject to eviction according to the terms of the eviction policy. Weights may also be indicative of whether a particular data chunk is part of a series of related data chunks, locality of a particular chunk to other chunks, reliance of other chunks on the particular data chunk, etc. as would be understood by a person having ordinary skill in the art upon reading the present disclosures.

Those having ordinary skill in the art will also appreciate, upon reading the instant disclosures, that corresponding evictions may be applied to entries in the long term dictionary 408-L, e.g. based on the long term eviction policy 414 (not shown), in further embodiments similar to the particular embodiment shown in FIG. 5C. However, as shown in FIG. 5C, and based at least in part on determining entry 408*a* corresponds to representative data chunk 404*a*, 410*a*, for region 430, entry 408*a* may be omitted from evictions occurring pursuant to the long term eviction policy 414.

With reference to FIG. 5D, the system 400 is shown in the context of a series of write operations being applied to a second region 432 of namespace 410, according to one embodiment. In the hypothetical scenario depicted, a data chunk 404*p* being written to address 410*p* in region 432 is part of a series of pending write requests that also includes data chunks 404*q*, . . . 404*z* scheduled for write to addresses 410*q*, . . . 410*z* (not shown) in region 432. Moreover, data chunk 404*p* is equal in content to the previously written data chunk 404*a* associated with address 410*a* in region 430. Data chunk 404*p* has been written to address 410*p* in region 432, preferably in a deduplicating manner based on detecting existence of corresponding data chunk 404*a* via corresponding entry 408*a* retained in the long term dictionary 408-L (e.g. due to chunk 404*a* at address 410*a* being representative of region 430).

According to a repopulation procedure (e.g. 416 as shown in FIG. 4), corresponding entries 408*b* . . . 408*n* evicted according to the embodiment shown in FIG. 5C are populated/inserted into the short term dictionary 408-S to facilitate writing the data chunks associated with the pending write requests to region 432 in a deduplicating manner. When subsequent write requests containing data chunks 404q, ... 404z are performed, there is a substantial likelihood that some or all of those data chunks will be equal in content to the previously written data chunks 404b, ... 404n associated with the entries 408b ... 408n. That substantial likelihood is the property referred to as locality. The repopulation procedure 416 makes it possible in this example instance for the duplications of content to be detected so that the write operations for data chunks 404q ... 404z may be performed in a deduplicating manner.

The pending write requests of data chunks 404q ... 404z are illustrative for how the repopulation procedure 416 makes the duplicate detection more effective. However, the repopulation procedure is performed whether or not such write requests are pending.

Figure 6:
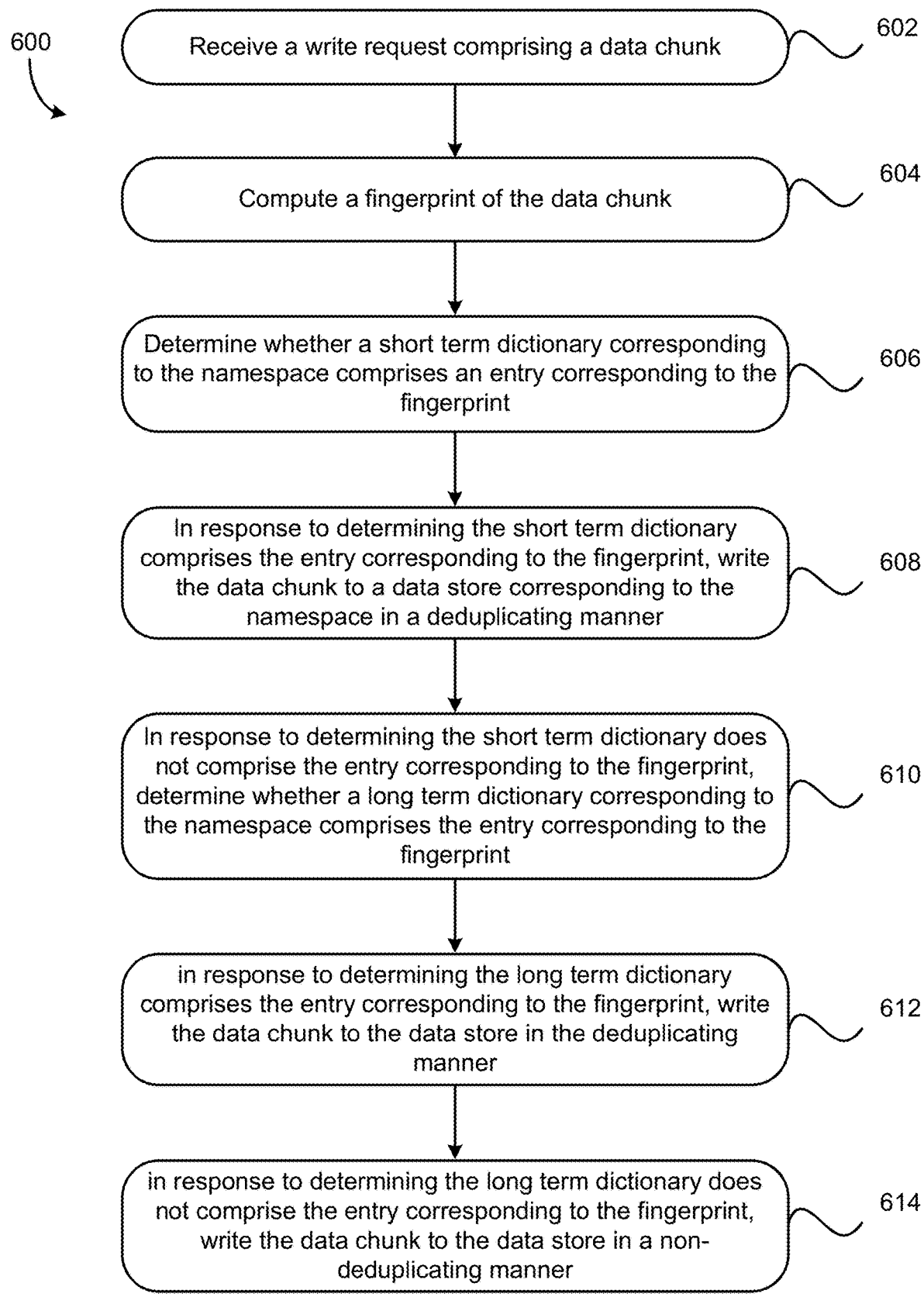
FIG. 6 is a flowchart of a method, according to one embodiment.

Now referring to FIG. 6, a flowchart of a method 600 for handling a write request in a storage environment as described herein is shown, according to one embodiment. The method 600 may be performed in accordance with the present invention in any of the environments depicted in FIGS. 1-5D, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a primary storage system, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 is configured for performing deduplication in conjunction with random read and write operations across a namespace. Method 600 accordingly includes operation 602, where a write request comprising a data chunk is received, e.g. at a deduplication engine 402 hosting a namespace 410.

In addition, method 600 includes, in operation 604, in which a fingerprint of the data chunk is determined, e.g. by computing a hash based on the content of the data chunk.

Method 600 also includes operation 606, in which a determination is made regarding whether a short term dictionary corresponding to the namespace comprises an entry corresponding to the fingerprint.

With continuing reference to FIG. 6, in operation 608 method 600 includes writing the data chunk to a data store corresponding to the namespace in a deduplicating manner in response to determining the short term dictionary comprises the entry corresponding to the fingerprint.

Further still, in operation 610, method 600 involves determining whether a long term dictionary corresponding to the namespace comprises the entry corresponding to the fingerprint in response to determining the short term dictionary does not comprise the entry corresponding to the fingerprint.

Operation 612 of method 600 includes writing the data chunk to the data store in the deduplicating manner in response to determining the long term dictionary comprises the entry corresponding to the fingerprint.

Additionally, method 600 includes operation 614 in which the data chunk is written to the data store in a non-deduplicating manner in response to determining the long term dictionary does not comprise the entry corresponding to the fingerprint.

As understood herein, writing in a non-deduplicating manner generally and preferably involves writing data chunk(s) to a physical location of the data store.

Of course, in various embodiments method 600 may include any number of additional and/or alternative features, operations, or functionalities as described herein. It should be understood that various embodiments may include any combination or permutation of features, operations, etc. without departing from the scope of the present disclosures.

For instance, in one embodiment in response to determining the long term dictionary comprises the entry corresponding to the fingerprint, the computer may repopulate the short term dictionary with the entry corresponding to the fingerprint. As noted above, e.g. with reference to FIG. 5D, other entries may also be repopulated, e.g. based in whole or in part on locality, relatedness, etc. of other corresponding data chunks.

In another embodiment, the namespace comprises a plurality of regions. Repopulating dictionaries accordingly includes adding a plurality of entries each corresponding to a data chunk associated with the region to the short term dictionary. The data chunks to which the plurality of entries correspond comprise substantially all data chunks associated with the region, in one approach.

In yet another embodiment, the namespace comprises a plurality of regions organized according to a predetermined hierarchy. The repopulating procedure, in such embodiments, comprises adding a plurality of entries each corresponding to a data chunk associated with the region to the long term dictionary.

The method 600 may also involve, in response to determining: the long term dictionary comprises the entry corresponding to the fingerprint; and the write request is associated with one or more sequential write requests, repopulating the short term dictionary with a plurality of entries each corresponding to a data chunk associated with the region. The plurality of entries preferably correspond to a plurality of data chunks associated with the region and characterized by a sequential progression of logical addresses in the ordered set of addresses corresponding to the region.

Implementing method 600 may also involve, in response to writing the data chunk to the data store of the namespace in the non-deduplicating manner, determining whether the data chunk is representative of one or more regions of the namespace.

The method 600 may additionally and/or alternative include, in response to determining the data chunk is representative of the one or more regions of the namespace, creating an entry in the long term dictionary corresponding to the data chunk.

In one embodiment, the namespace comprises a plurality of regions, each region corresponding to one or more logical addresses, and at least one of the regions corresponding to a respective ordered set of addresses. Preferably, a representative address for each of the at least one regions is a first address within the respective ordered set of addresses.

Additionally, the method 600 may include inserting a limited fraction of entries from the short term dictionary into the long term dictionary based on a predefined insertion policy, the limited fraction of entries comprising less than 10% of the entries of the short term dictionary eligible for insertion into the long term dictionary.

In one embodiment, each of the limited fraction of entries are determined based at least in part on a virtual address of the data chunk to which the entry corresponds.

In various embodiments, the namespace comprises a plurality of regions, each region having associated therewith at least one representative data chunk.

Preferably, entries of the short term dictionary and entries of the long term dictionary each comprise a fingerprint associated with a physical location of the data store, the physical location of the data store being the physical location of the data chunk to which the entry corresponds.

Additionally and/or alternatively, each of the short term dictionary and the long term dictionary may include a data structure selected from a group consisting of: a simple hash table in one compute node; a partitioned set of hash tables distributed over multiple nodes; a set of lists addressed through a local or distributed hash table; a chain of separate sub-dictionaries; and a map of separate sub-dictionaries associated with distinct contexts.

Further still, a duplicate chunk finder of the namespace may include the short term dictionary and the long term dictionary, the duplicate chunk finder being configured to determine whether the short term dictionary and/or the long term dictionary comprise the entry corresponding to the fingerprint. The duplicate chunk finder may optionally comprise a permanent dictionary comprising one entry per region of the namespace and the permanent dictionary being configured to permanently retain valid entries.

In more approaches, method 600 may include, in response to determining the long term does not comprise the entry corresponding to the fingerprint, determining whether the permanent dictionary comprises an entry corresponding to the fingerprint rather than writing the data chunk to the data store of the namespace in the non-deduplicating manner.

Additionally and/or alternatively, where the namespace comprises a plurality of regions, the method 600 may involve, e.g. in response to determining the permanent dictionary comprises the entry corresponding to the fingerprint, repopulating the short term dictionary with the entry corresponding to the fingerprint and a plurality of entries associated with a region of the entry corresponding to the fingerprint.

Moreover, the namespace may be divided into a plurality of non-overlapping regions according to one or more proximity criteria.

The foregoing descriptions have been provided in the context of a storage system implementing a block-based storage architecture. However, skilled artisans reading the present description will comprehend that the instant disclosures are also relevant to other storage architectures, particularly virtual storage such as object-based storage, cloud storage, etc. in various embodiments. Accordingly, the presently described inventive concepts may be employed on other storage architectures without departing from the scope of these disclosures.

The presently disclosed inventive concepts may be embodied as a system, a method, and/or a computer program product. The computer program product may include a computer readable storage medium (or media) having computer readable program instructions thereon for causing a processor to carry out aspects of the instant disclosure, in any combination or permutation.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A deduplicating storage system configured to perform deduplication in conjunction with random read and write operations across a namespace, the system comprising: a processor and logic integrated with the processor, executable by the processor, or integrated with and executable by the processor, the logic being configured to cause the processor to perform a method comprising:
   computing a fingerprint of a data chunk;
   determining whether a short term dictionary corresponding to the namespace comprises an entry corresponding to the fingerprint;
   in response to determining the short term dictionary comprises the entry corresponding to the fingerprint, writing the data chunk to a data store corresponding to the namespace in a deduplicating manner;
   in response to determining the short term dictionary does not comprise the entry corresponding to the fingerprint, determining whether a long term dictionary corresponding to the namespace comprises the entry corresponding to the fingerprint;
   in response to determining the long term dictionary comprises the entry corresponding to the fingerprint:
      writing the data chunk to the data store in the deduplicating manner; and
      repopulating the short term dictionary with the entry corresponding to the fingerprint; and
   in response to determining the long term dictionary does not comprise the entry corresponding to the fingerprint, writing the data chunk to the data store in a non-deduplicating manner,
   wherein the short term dictionary comprises a first eviction policy,
   wherein the long term dictionary comprises a second eviction policy,
   wherein the first eviction policy is configured to evict one or more entries of the short term dictionary in response to a new entry being inserted into the short term dictionary, and
   wherein the second eviction policy is configured to evict one or more entries of the long term dictionary in response to a new entry being inserted into the long term dictionary.

2. The deduplicating storage system as recited in claim 1, wherein the namespace comprises a plurality of regions;

wherein the repopulating comprises adding a plurality of entries each corresponding to a data chunk associated with one of the plurality of regions to the short term dictionary; and wherein the data chunks to which the plurality of entries correspond comprise substantially all data chunks associated with the one of the plurality of regions.

3. The deduplicating storage system as recited in claim 2, wherein the plurality of regions are organized according to a predetermined hierarchy; and wherein the repopulating comprises adding a plurality of entries each corresponding to a data chunk associated with the one of the plurality of regions to the long term dictionary.

4. The deduplicating storage system as recited in claim 1, wherein the namespace comprises a plurality of regions, each region corresponding to one or more logical addresses, and at least one of the regions corresponding to a respective ordered set of addresses, where a representative address for each of the at least one of the regions is a first address within the respective ordered set of addresses.

5. The deduplicating storage system as recited in claim 4, the logic being configured to cause the processor to perform the method comprising: in response to determining the long term dictionary comprises the entry corresponding to the fingerprint;

and a write request the data chunk is included in is associated with one or more sequential write requests, repopulating the short term dictionary with a plurality of entries each corresponding to a data chunk associated with the at least one of the regions; and wherein the plurality of entries correspond to a plurality of data chunks associated with the at least one of the regions and characterized by a sequential progression of logical addresses in the ordered set of addresses corresponding to the at least one of the regions.

6. The deduplicating storage system as recited in claim 1, the logic being configured to cause the processor to perform the method comprising: in response to determining the short term dictionary comprises the entry corresponding to the fingerprint, the long term dictionary comprises the entry corresponding to the fingerprint, or the short term dictionary comprises the entry corresponding to the fingerprint and the long term dictionary comprises the entry corresponding to the fingerprint:

designating a write request the data chunk is included in as a first duplicate write associated with a first prior write; and repopulating the short term dictionary with a group of entries corresponding to a plurality of prior writes.

7. The deduplicating storage system as recited in claim 6, wherein the first duplicate write and each of the plurality of prior writes are proximate to each other with respect to: write time, virtual address, or write time and virtual address.

8. The deduplicating storage system as recited in claim 1, the logic being configured to cause the processor to perform the method comprising: in response to writing the data chunk to the data store of the namespace in the non-deduplicating manner, determining whether the data chunk is representative of one or more regions of the namespace; and in response to determining the data chunk is representative of the one or more regions of the namespace, creating an entry in the long term dictionary corresponding to the data chunk.

9. The deduplicating storage system as recited in claim 1, wherein entries of the short term dictionary and entries of the long term dictionary each independently comprise a fingerprint associated with a physical location of the data store, the physical location of the data store being the physical location of the data chunk to which the respective entry corresponds.

10. The deduplicating storage system as recited in claim 1, wherein each of the short term dictionary and the long term dictionary comprise a data structure selected from a group consisting of: a simple hash table in one compute node; a partitioned set of hash tables distributed over multiple nodes; a set of lists addressed through a local or distributed hash table; a chain of separate sub-dictionaries; and a map of separate sub-dictionaries associated with distinct contexts.

11. The deduplicating storage system as recited in claim 1, the logic being configured to cause the processor to perform the method comprising: inserting a limited fraction of entries from the short term dictionary into the long term dictionary based on a predefined insertion policy, the limited fraction of entries inserted into the long term dictionary comprising less than 10% of the entries of the short term dictionary eligible for insertion into the long term dictionary; and wherein each of the limited fraction of entries are determined based at least in part on a virtual address of the data chunk to which the entry corresponds.

12. The deduplicating storage system as recited in claim 1, wherein a duplicate chunk finder comprises the short term dictionary and the long term dictionary, the duplicate chunk finder being configured to determine: whether the short term dictionary comprises the entry corresponding to the fingerprint, whether the long term dictionary comprises the entry corresponding to the fingerprint, or whether the short term dictionary comprises the entry corresponding to the fingerprint and the long term dictionary comprises the entry corresponding to the fingerprint;

wherein the duplicate chunk finder comprises a permanent dictionary comprising one entry per region of the namespace, the permanent dictionary being configured to permanently retain valid entries; and wherein the logic is configured to cause the processor to perform the method comprising: in response to determining the long term dictionary does not comprise the entry corresponding to the fingerprint, determining whether the permanent dictionary comprises an entry corresponding to the fingerprint rather than writing the data chunk to the data store of the namespace in the non-deduplicating manner.

13. The deduplicating storage system as recited in claim 12, wherein the namespace comprises a plurality of regions; and wherein the logic is configured to cause the processor to perform the method comprising: in response to determining the permanent dictionary comprises the entry corresponding to the fingerprint, repopulating the short term dictionary with:

the entry corresponding to the fingerprint; and a plurality of entries associated with the entry corresponding to the fingerprint.

14. The deduplicating storage system as recited in claim 1, wherein evicted entries are chosen by the first eviction policy and the second eviction policy based at least in part on:

whether the one or more entries have previously been detected as a prior for a duplicate write to the namespace; and a regency with which the one or more entries have previously been detected as the prior for the duplicate write to the namespace.

15. The deduplicating storage system as recited in claim 1, wherein the namespace is divided into a plurality of non-overlapping regions according to one or more proximity criteria.

16. The deduplicating storage system as recited in claim 1, wherein the first eviction policy is invoked in response to determining a number of vacancies in the short term dictionary is less than a predetermined minimum vacancy threshold; and wherein the second eviction policy is invoked in response to determining a number of vacancies in the long term dictionary is less than the predetermined minimum vacancy threshold.

17. The deduplicating storage system as recited in claim 1, wherein each entry in the short term dictionary is associated with a first lifetime parameter configured to enforce an age distribution among all entries in the short term dictionary; and wherein each entry in the long term dictionary is associated with a second lifetime parameter configured to enforce an age distribution among all entries in the long term dictionary.

* * * * *